(12) United States Patent
Herz

(10) Patent No.: US 11,972,271 B2
(45) Date of Patent: Apr. 30, 2024

(54) END USER SENSITIVITY PROFILING FOR EFFICIENCY AND PERFORMANCE MANAGEMENT

(71) Applicant: Advanced Micro Devices, Inc., Santa Clara, CA (US)

(72) Inventor: William Herz, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/565,593

(22) Filed: Dec. 30, 2021

(65) Prior Publication Data

US 2023/0214232 A1 Jul. 6, 2023

(51) Int. Cl.
*G06F 1/3206* (2019.01)
*G06F 9/445* (2018.01)

(52) U.S. Cl.
CPC .......... *G06F 9/4451* (2013.01); *G06F 1/3206* (2013.01)

(58) Field of Classification Search
CPC .............................. G06F 9/4451; G06F 1/3206
See application file for complete search history.

(56) References Cited

U.S. PATENT DOCUMENTS

| | | | |
|---|---|---|---|
| 6,606,577 B1* | 8/2003 | Fukuhara | A61B 5/161 702/183 |
| 10,687,155 B1* | 6/2020 | Clark | H04R 25/505 |
| 2008/0062291 A1* | 3/2008 | Sako | G02B 27/0093 348/207.99 |
| 2014/0111558 A1* | 4/2014 | Ishitani | G09G 5/10 345/690 |
| 2015/0150444 A1* | 6/2015 | Bex | A61B 3/06 351/242 |
| 2018/0040285 A1* | 2/2018 | Sakurai | G09G 3/3618 |
| 2019/0007626 A1* | 1/2019 | Kirsch | B60R 1/00 |
| 2019/0324276 A1* | 10/2019 | Edwin | G02B 27/0172 |

\* cited by examiner

*Primary Examiner* — Gary Collins
(74) *Attorney, Agent, or Firm* — Volpe Koenig

(57) ABSTRACT

A processing device is provided which comprises memory and a processor, in communication with the memory. The processor is configured to acquire information indicating a sensory perception of a user, determine settings for one or more parameters used to control operation of the device based on the information indicating the sensory perception of the user and control the operation of the device by tuning the one or more parameters according to the determined settings.

20 Claims, 5 Drawing Sheets

END USER SENSITIVITY PROFILING FOR EFFICIENCY AND PERFORMANCE MANAGEMENT

BACKGROUND

Systems are increasingly integrating large numbers of different types of components on a single chip or on multi-chip modules. The complexity of power consumption and performance of a system increases with the number of different types of components. Efficiency and performance management are important aspects of the design and operation of integrated circuits. For example, efficient use of power is important for circuits that are integrated within devices which typically rely on battery power, such as mobile devices because reducing power consumption in the integrated circuits of these devices can increase the life of the battery as well as decrease the heat generated by the integrated circuits.

BRIEF DESCRIPTION OF THE DRAWINGS

A more detailed understanding can be had from the following description, given by way of example in conjunction with the accompanying drawings wherein.

DETAILED DESCRIPTION

Figure 1:
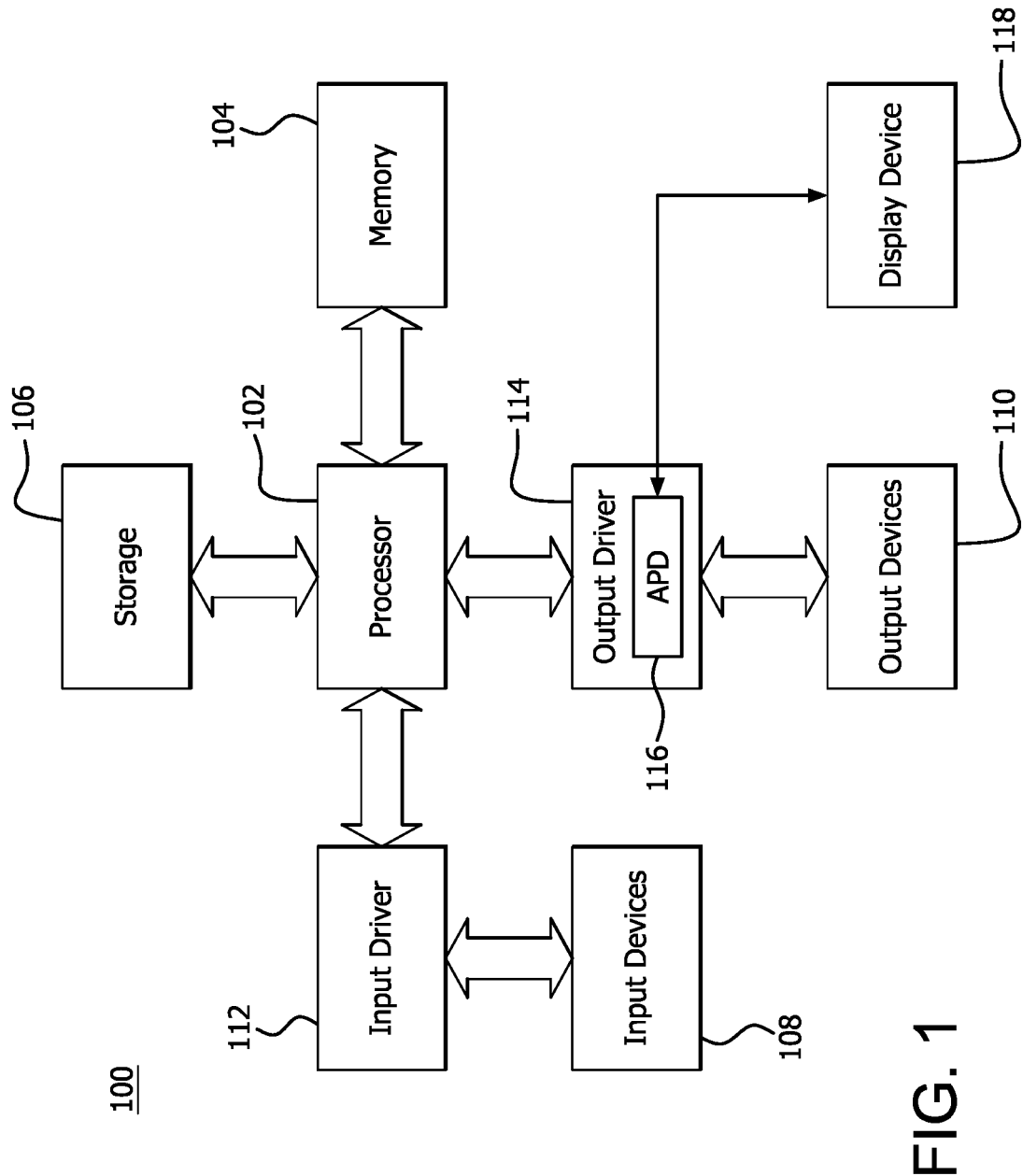
FIG. 1 is a block diagram of an example device in which application profiling for managing efficiency and performance is implemented.

Various factors contribute to the efficiency (e.g., resources, such as power, expended to perform work) and performance (e.g., video and audio quality, frame rate, frequency response, volume, equalization, light level as well as other performance parameters) of the device and peripheral devices (e.g., input peripheral devices such as a keyboard and mouse, output peripheral devices such as speakers and display devices and storage devices). These factors include, but are not limited to, power consumption, bandwidth usage, latency, quality (e.g., visual quality and audio quality), the type of component (e.g., type of processor or core, type of processor core engine) used to process data, cost of components (e.g., memory and storage), cost of devices used with the computing devices (e.g., cost of speakers), as well as opportunity costs (e.g., cost of using one or more resources to perform functions in order to free up one or more other resources to perform other functions). In addition, the efficiency and performance factors of a computing device also affect or contribute to costs external to the computing device (e.g., costs to server or provider which provides information (e.g., streaming video).

Conventional techniques for managing efficiency and performance include dynamically switching power between different processors, such as a central processing unit (CPU), an accelerated processing unit (APU) and a graphics processing unit (GPU) (e.g., dedicated GPU (dGPU)), adaptively changing amounts of memory usage (e.g., resizable PCIe base address register (BAR)), as well as using a specific memory type for use with a device (e.g., graphics double data rate (GDDR) synchronous dynamic random-access memory (SDRAM) for use with a GPU). However, these conventional techniques require specific instrumentation (based meters, counters) tailored for a particular component of a device or platform and do not consider a user's sensory perception, such as for example sensitivity to sound and images, for tuning device parameters to manage efficiency and performance based on the user's sensory perception.

Standards for video and audio compression and multimedia delivery (e.g., Moving Picture Experts Group (MPEG) standards) are based on an average sensory perception of all users. Accordingly, these standards specify video and audio compression formats for providing sound and video at a minimum level of quality that is suitable for the average user (i.e., an average sensory perception). Likewise, these standards also do not consider an individual user's sensory perception (e.g., sensitivity to sound, such as dynamic range and sensitivity to images, such as flicker and frame rate), which is likely to be distinguishable from the average user's sensory perception For example, the human ear can detect a wide range of sound frequencies, typically between a range of 20 Hz to 20,000 Hz. But human sensitivity to sound varies with frequency. The hearing frequency range varies between individuals, especially at higher frequencies (e.g., as people age, there is typically a gradual loss of sensitivity to higher sound frequencies). If, for example, a user of a device is unable to hear sound in a particular frequency range (e.g., an older person who is not sensitive to sound over 10,000 Hz), conventional efficiency and performance techniques do not consider the user's sensory perception (i.e., the user's sensitivity to sound) to set one or more device parameters used to control the efficiency and performance of the device. Accordingly, in the example above, when conventional techniques are used, the device is not efficiently managed because, for example, additional power is often wasted to reproduce sound (e.g., amplifying the sound and compressing sound data) at a higher level of sound quality when a lower level quality is suitable for maintaining a sufficient level of quality for the user, resulting in efficient use of resources.

Likewise, visual sensitivity also varies between individuals. For example, color discernment (e.g., minimum gradation of one or more colors that are visually perceptible) and sensitivity to flicker of displayed video varies between individuals. If, for example, an individual user of a device begins to notice flicker at a particular frame rate, conventional power and performance techniques do not consider the user's visual sensitivity. Accordingly, in this example, when conventional techniques are used, the device is not efficiently managed because, for example, additional power is wasted to produce video at a higher level of video quality (e.g., higher frame rate) when a lower level of quality is suitable for maintaining a sufficient level of quality for the user.

The present application discloses apparatuses and methods for managing the efficiency and performance of a device. For example, features of the present application manage the efficiency (e.g., manage power consumption or other resources expended to perform work) while maintaining a sufficient level of performance based on acquired information indicating a user's sensory perception (e.g., visual perception, aural perception or other sensory perception). Examples of acquired information include, but are not limited to, information indicating a user's sensory perception (e.g., sensitivity) of displayed images or video, a user's sensory perception of sound provided by the device and a user's tactile sensitivity. Additionally, environmental conditions and room conditions (e.g., room acoustics and distance between a user and a display, microphone or speaker) can also be used to determine a user's sensory perception.

Features of the present application utilize user sensory information to manage the efficiency and performance of a device according to one or more of a plurality of factors such as bandwidth usage, latency, quality (e.g., visual quality and audio quality), a component type (e.g., a processor, a processor core, a processor core engine) used to process data, cost of peripheral devices (e.g., memory, storage and speakers), as well as opportunity costs (e.g., cost of using one or more resources to perform functions in order to free up one or more other resources to perform other functions). In addition, the efficiency and performance factors of a computing device also include factors which affect or contribute to costs external to the computing device (e.g., costs to server or provider which provides information (e.g., streaming video).

Settings of a device are tailored to an individual user of a device based on the acquired information indicating the user's sensory perception. The settings include, but are not limited to, one or more parameters used to control operation (e.g., controlling the display of images or video, controlling the sound provided by the device, controlling (e.g., switching between) different power modes of operation and controlling (e.g., switching between) different processors of a device (e.g., using the APU when in a power conserving mode, using the dGPU when not in a power conserving mode). Examples of parameters used to control operation of the device include, but are not limited to parameters used to control compressing video and audio data (e.g., sampling rate, frame rate), dynamic range, frequency response, reverb, equalization, gain, frequency response, removal of ambient/acoustic noise, video graphics rendering, filtering, video, color sensitivity, color sensitivity, flicker, compression artifacts, speed of operations, memory usage, bandwidth, dynamic power management (DPM) parameters (e.g., clock speed parameters, clock voltage parameters, and clock gating parameters), memory timing parameters and parameters for amounts of heat generated (e.g., thermal design power (TDP)).

Device settings are tailored, for example, by tuning device driver settings, tuning firmware settings (e.g., firmware used to control settings for peripherals or components of the device), tuning operating system settings or other device settings which are used to control operation of the device to manage efficiency and performance.

For example, based on acquired information indicating a user's lack of sensitivity to sound, such as a user's inability to hear or perceive sound greater than a particular frequency (e.g., a frequency limit of 10,000 Hz), settings for parameters used to control the sound provided at the device (e.g., settings for compressing audio data, speaker settings, amplifier settings) are tuned to produce the sound at a lower audio quality (e.g., lower frequency than a frequency specified by a standard, such as MPEG, AC3, MP3, ATRAC, AAC, Ogg Vorbis) that is suitable to the user's aural perception. Accordingly, power consumed to produce the sound at the tuned settings is reduced. Alternatively, if the acquired information indicates that the user is more sensitive to sound, the settings for parameters used to control the sound provided at the device are tuned to produce the sound at a higher audio quality (e.g., higher frequency) suitable for maintaining a sufficient level of audio quality for the user.

In another example, based on acquired information indicating a user's lack of sensitivity to displayed images or video (e.g., lack of sensitivity to flicker), settings for parameters used to control the display of images or video (e.g., frame rate settings, settings for compressing video data, rendering settings, filter settings and other settings used to control the display of images or video) are tuned to produce the video at a lower video quality suitable to the user's visual perception. Accordingly, less power is consumed to provide the video at a sufficient level of quality perceptible by the user. Alternatively, if the acquired information indicates that the user is more sensitive to flicker, the settings for parameters used to control the display of images or video are tuned to produce the video at a higher video quality to maintain a level of video quality sufficient for the user (e.g., provide the video at a higher frame rate, filter out high frequency video components, or process the video at a lower resolution sufficient to prevent flicker from being visually perceived by the user).

Although the examples above describe setting video and audio quality device parameters to manage performance and efficiency, these settings are merely used as examples. Features of the present application utilize the acquired user sensory information to manage the efficiency and performance of a device by setting any device parameters which can be used to control and manage the efficiency and performance of the device according to a variety of factors. For example, these factors include but are not limited to frame rate, frequency response, volume, equalization, light level, power consumption, bandwidth usage, latency, quality (e.g., visual quality and audio quality), the type of component (e.g., type of processor or core, type of processor core engine) used to process data, cost of components (e.g., memory and storage), cost of devices used with the computing devices (e.g., cost of speakers), For example, based on the acquired user sensory information, the efficiency and performance of the device can be managed by moving workloads between different processors and processor cores of a device. For example, based on user sensory perception information, a workload is determined to be processed by one processor (e.g., CPU) while an audio co-processor (ACP) is used to process audio data. That is, it is determined from the user sensory perception information that the ACP is better served for the user to process a portion of audio data.

Factors for controlling and managing the efficiency and performance of the device also include determining (e.g., weighing) the opportunity costs of setting one or more parameters versus one or more other parameters. For example, this determination can include the cost of using resources (e.g., processor, memory, bandwidth or other resources) to perform functions in order to free up other resources to perform other functions, In addition, the efficiency and performance factors of a computing device also affect or contribute to costs external to the computing device (e.g., costs to server or provider) which provides information (e.g., streaming video) to the computing devices, as described in more detail below.

Sensory perception information is, for example, acquired in response to prompting a user to perform one or more tasks (e.g., view video that is displayed using different device setting, such as different frame rates) and monitoring the sensory perception of the user while performing the one or more tasks (e.g., viewing the displayed video). Information indicating a sensory perception of the user is then acquired based on the monitoring. Alternatively, the information indicating the sensory perception of the user is information that is acquired from the user in response to a controlled stimulus to the user. The user can be made aware of the stimulus or the stimulus can be provided without the user being aware. In response to the controlled stimulus, the sensory perception of the user is monitored and the sensory data to be presented to the user is determined (e.g., via algorithm based insights) from the information acquired from the user in response to the controlled stimulus. For example, the video is displayed to the user at different frame rates without the user being made aware of the video being displayed at different frame rates. The user is monitored for physical reactions to determine a sensory perception of the user (e.g., whether or not the user observes flicker at different frame rates).

Additionally, or alternatively, sensory perception information is acquired by prompting the user to provide the information indicating their sensory perception. For example, while performing the one or more tasks (e.g., viewing the displayed video at different frame rates), the user is asked to answer one or more questions indicating a sensory perception (e.g., whether or not the user observes flicker at different frame rates). The sensory perception information is also acquired, for example, without prompting the user to perform the one or more tasks. For example, the sensory perception information is acquired by prompting the user to answer one or more questions (e.g., whether the user is color blind) which indicate a sensory perception of the user.

The present application provides a processing device comprising memory and a processor, in communication with the memory. The processor is configured to acquire information indicating a sensory perception of a user, determine settings for one or more parameters used to control operation of the device based on the information indicating the sensory perception of the user and control the operation of the device by tuning the one or more parameters according to the determined settings.

The present application provides a method for managing efficiency and performance of a device. The method comprises acquiring information indicating a sensory perception of a user, determining settings for one or more parameters used to control operation of the device based on the information indicating the sensory perception of the user and controlling the operation of the device by tuning the one or more parameters according to the determined settings.

The present application provides a non-transitory computer readable medium including instructions for causing a computer to execute a method for managing efficiency and performance of a device. The instructions comprise acquiring information indicating a sensory perception of a user, determining settings for one or more parameters used to control operation of the device based on the information indicating the sensory perception of the user and controlling the operation of the device by tuning the one or more parameters according to the determined settings.

As used herein, programs includes any sequence of instructions to be executed using one or more processors to perform procedures or routines (e.g., operations, computations, functions, processes, jobs). As used herein, execution of programmed instructions (e.g., applications, drivers, operating systems or other software) on a processor includes any of a plurality of stages, such as but not limited to fetching, decoding, scheduling for execution, beginning execution and execution of a particular portion (e.g., rendering of video on full screen) of the programmed instructions. Programmed instructions include parameter settings (e.g., hardware parameter settings) and parameters (e.g., hardware parameters) having tunable (i.e., changeable) values used to control operation of hardware.

FIG. 1 is a block diagram of an exemplary device 100. The device 100 includes, for example, a computer, a gaming device, a handheld device, a set-top box, a television, a mobile phone, or a tablet computer. As shown in FIG. 1, exemplary device 100 includes a processor 102, memory 104, a storage 106, one or more input devices 108, one or more output devices 110, an input driver 112 and an output driver 114. It is understood that the device 100 can include additional components not shown in FIG. 1.

Exemplary processor types for processor 102 include a CPU, a GPU, a CPU and GPU located on the same die, or one or more processor cores, wherein each processor core is a CPU or a GPU. Memory 104 is, for example, located on the same die as the processor 102 or located separately from the processor 102. Exemplary memory types for memory 104 include volatile memory, (e.g., random access memory (RAM), dynamic RAM, or a cache) and non-volatile memory (e.g., a hard-disk, motherboard boot read only memory (ROM), and BIOS memory) configured to store, for example firmware which includes hardware parameters, as described in more detail below.

Exemplary storage types for storage 106 include a fixed or removable storage, for example, a hard disk drive, a solid state drive, an optical disk, or a flash drive. Exemplary input device types for input device 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Exemplary output device types for output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 is an optional component (indicated by dashed lines) and that the device 100 will operate in the same manner if the input driver 112 is not present.

The output driver 114 includes an accelerated processing device (APD) 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data (SIMD) paradigm. Although various functionality is described herein as being performed by or in conjunction with the APD 116, the functionality described as being performed by the APD 116 is also performed by other computing devices having similar capabilities that are not driven by a host processor (e.g., processor 102) and configured to provide graphical output to a display device 118. The functionality described herein is, for example, performed by any processing system that performs processing tasks in accordance with a SIMD paradigm. Alternatively, the functionality described herein is performed by computing systems that do not perform processing tasks in accordance with a SIMD paradigm.

Figure 2:
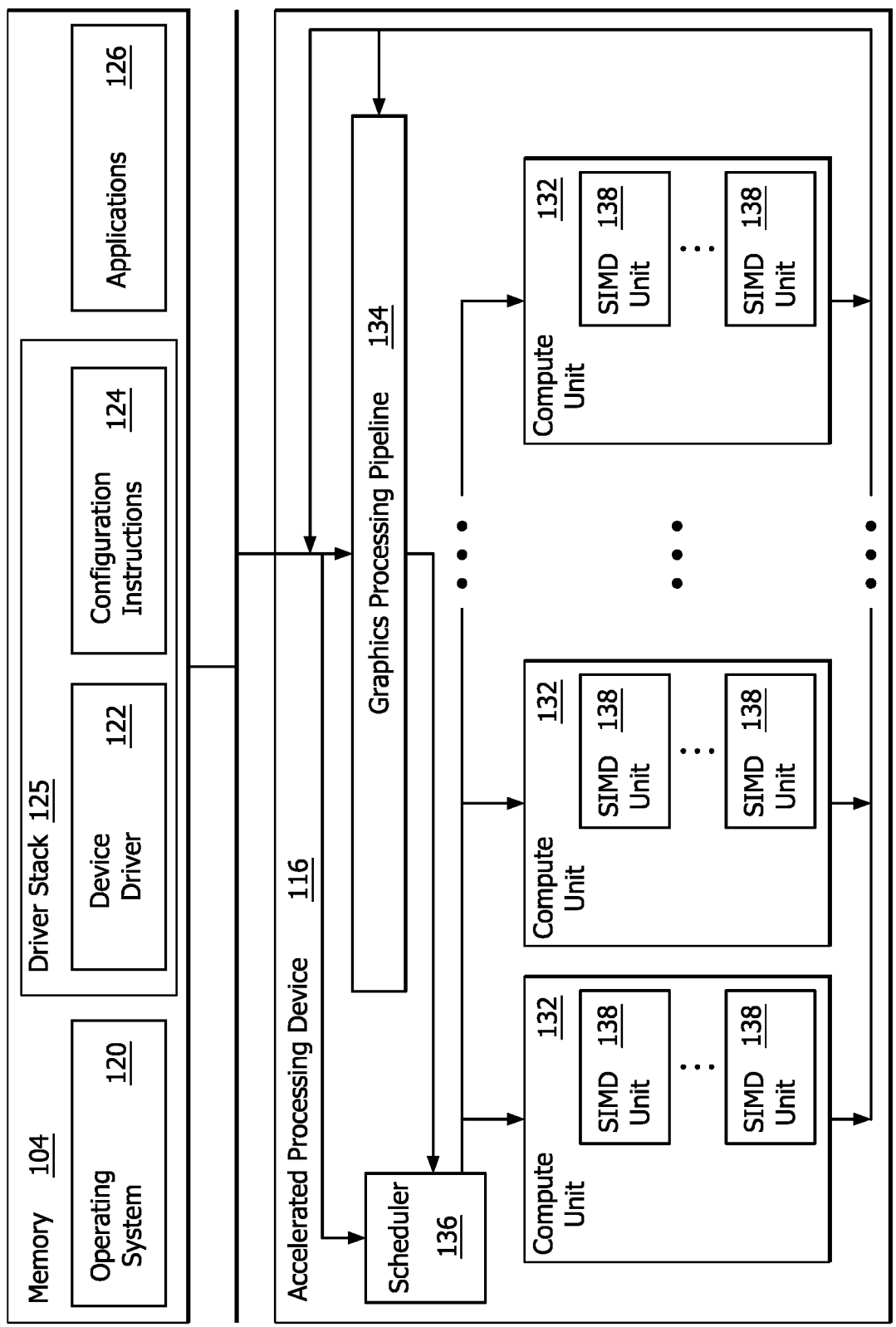
FIG. 2 is a block diagram illustrating additional details related to execution of processing tasks on the accelerated processing device shown in FIG. 1.

FIG. 2 is a block diagram illustrating additional details related to execution of processing tasks on the APD 116 of the device 100 shown in FIG. 1. The processor 102 maintains, in system memory 104, one or more control logic modules which include programmed instructions for execution by the processor 102. Programmed instructions can also be included in processor 102 (e.g., CPU). The control logic modules include an operating system 120, a device driver 122 (e.g., kernel mode driver, user mode driver, universal mode driver), applications 126 which execute on the APD 116 and configuration instructions 124 (e.g., instructions in a configuration file, blob file, extension file, and the like) which store predetermined hardware parameter settings for each executable application 126. As shown in FIG. 2, the device driver 122, and configuration instructions 124 are part of a driver stack 125. Driver stack 125 also includes, for example, programmed instructions which support the tuning of hardware parameters (e.g., clock speed parameters, clock voltage parameters, clock gating parameters) to manage the efficiency (e.g., power consumption) and performance by the hardware during execution of each application.

These control logic modules control various aspects of the operation of the processor 102 and the APD 116. For example, the operating system 120 directly communicates with hardware (e.g., CPU, GPU and compute units 132) and provides an interface to the hardware for other software executing on the processor 102. The device driver 122 controls operation of the APD 116 by, for example, providing an API to software (e.g., applications 126) executing on the processor 102 to access various functionality of the APD 116. The device driver 122 also includes, for example, a just-in-time compiler that compiles programs for execution by processing components of the APD 116.

The APD 116 executes commands and programs for selected functions, such as graphics operations and non-graphics operations suited, for example, to perform parallel processing. The APD 116 is used, for example, to execute graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

Exemplary processor types for APD 116 include a CPU, a GPU, a CPU and GPU located on the same die, or one or more processor cores (i.e., compute units) 132 wherein each processor core is a CPU or a GPU. Each compute unit (i.e., compute core) 132 includes one or more SIMD units 138 each configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

A scheduler 136 is configured to perform operations related to scheduling various units of execution (e.g., work groups and wavefronts) on different compute units 132 and SIMD units 138. Execution of processing tasks on the APD 116 is suitable for graphics related operations such as pixel value calculations, vertex transformations, and other graphics operations. A graphics pipeline 134 which accepts graphics processing commands from the processor 102 can therefore provide computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
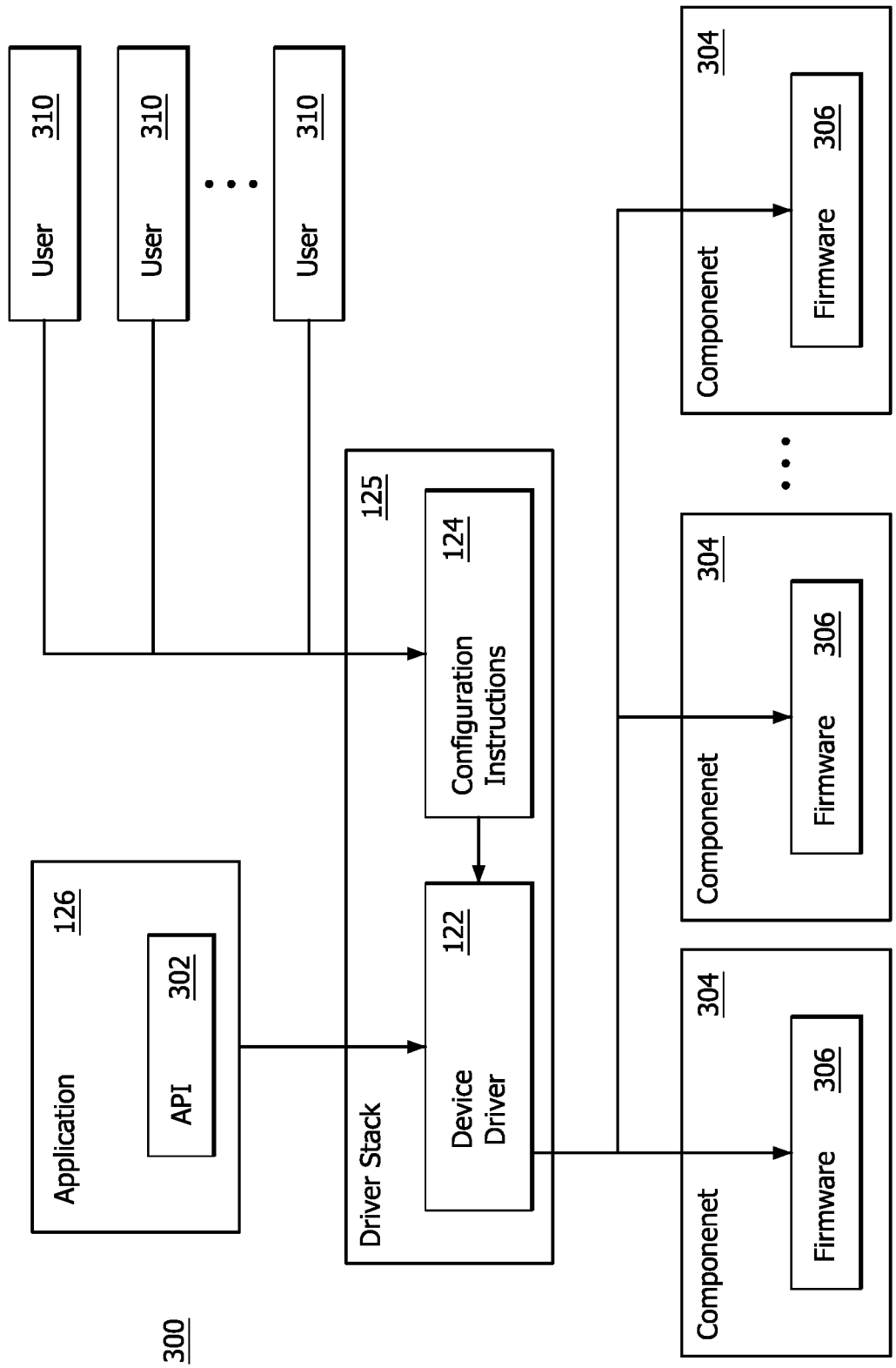
FIG. 3 is a block diagram illustrating example components and information flow of a device in which efficiency and performance is managed according to features of the present disclosure.

FIG. 3 is a block diagram 300 illustrating example components and information flow of a device 300 in which efficiency and performance is managed according to features of the present disclosure. The number of components and types of components of the device 300 is merely an example used for simplified explanation. Features of the present disclosure can be implemented for devices having additional components and component types other than those shown in FIG. 3.

The 300 includes an application 126 with one or more APIs 302, a driver stack 125 including device driver 122 and configuration instructions 124 and a plurality of components 304. Each component 304 is, for example, a processing device (e.g., output driver 114 shown in FIG. 1).

As described above, device settings are tailored, for example, by tuning settings for one or more parameters used to control operation of a device, such as device 300. Device settings are tailored to a particular user of the device 300 by tuning parameters of settings, such as for example, settings of device driver 122, settings of firmware 306 of one or more components 304, settings of operating system 120 (shown in FIG. 2) or other device settings.

The driver stack 125 includes device driver 122 used to interface between the operating system 120 and the firmware 306 and configuration instructions 124. Configuration instructions 124 include, for example, settings for each identified user 310 of device 300, which are used to tune parameters for controlling the operation of the device for each user 310.

Firmware 306 includes hardware parameters and associated values to control operation of hardware of the device 304 (e.g., graphics card) and provide an interface between the hardware (e.g., APD 116) of the device 304 and device driver 122. As described above, firmware is stored in non-volatile memory (e.g., a hard-disk, motherboard boot read only memory (ROM), and BIOS memory). Processor 102 is configured to identify an application executing at device 304 (e.g., executing on APD 116), and read firmware 306 from non-volatile memory to be processed at device 304, as shown in FIG. 3. The firmware 306 is used, along with the device driver 122, to control operation of hardware (e.g., APD 116) of device 304.

The APD 116 is configured to execute (e.g., schedule for execution, execute) an application 126 using, for example, the operating system 120, the device driver 122 and the configuration instructions 124. For example, the operating system 120 communicates with firmware 306 and provides an interface to the hardware for application 126 executing on the APD 116. The device driver 122 controls operation of the APD 116 by, for example, providing API 302 to applications 126 executing on the APD 116 to access various functionality of the APD 116.

In one example, the configuration instructions 124 include settings of parameters used to control the operation of the device during execution of an identified application 126 on the device for an identified user 310 operating the device. Tuning is performed, by setting the values of parameters according to the parameter settings stored in the configuration instructions 124 for a particular user. For example, when a specific user 310 is identified and an executing application 126 is identified, device driver 122 parses the configuration instructions 124 and reads the settings from the configuration instructions 124 for the identified application 126 and the identified user. The stored data is passed to device driver 122 (e.g., kernel mode driver) and additional structures, which support the stored settings to manage efficiency and performance.

Examples of parameter settings of a device, which are tuned to manage the efficiency and performance of a device based on user sensory information include, settings for frame rate, frequency response, volume, equalization, light level, power consumption, bandwidth usage, latency, quality (e.g., visual quality and audio quality), the type of component (e.g., type of processor or core, type of processor core engine) used to process data, cost of components (e.g., memory and storage), cost of devices used with the computing devices (e.g., cost of speakers), and opportunity costs (e.g., cost of using one or more resources to perform functions in order to free up one or more other resources to perform other functions), In addition, based on user sensory information, the parameter settings of a computing device can be tuned to reduce costs external to the computing device (e.g., costs to server or provider which provides information (e.g., streaming video) to the computing devices.

Figure 4:
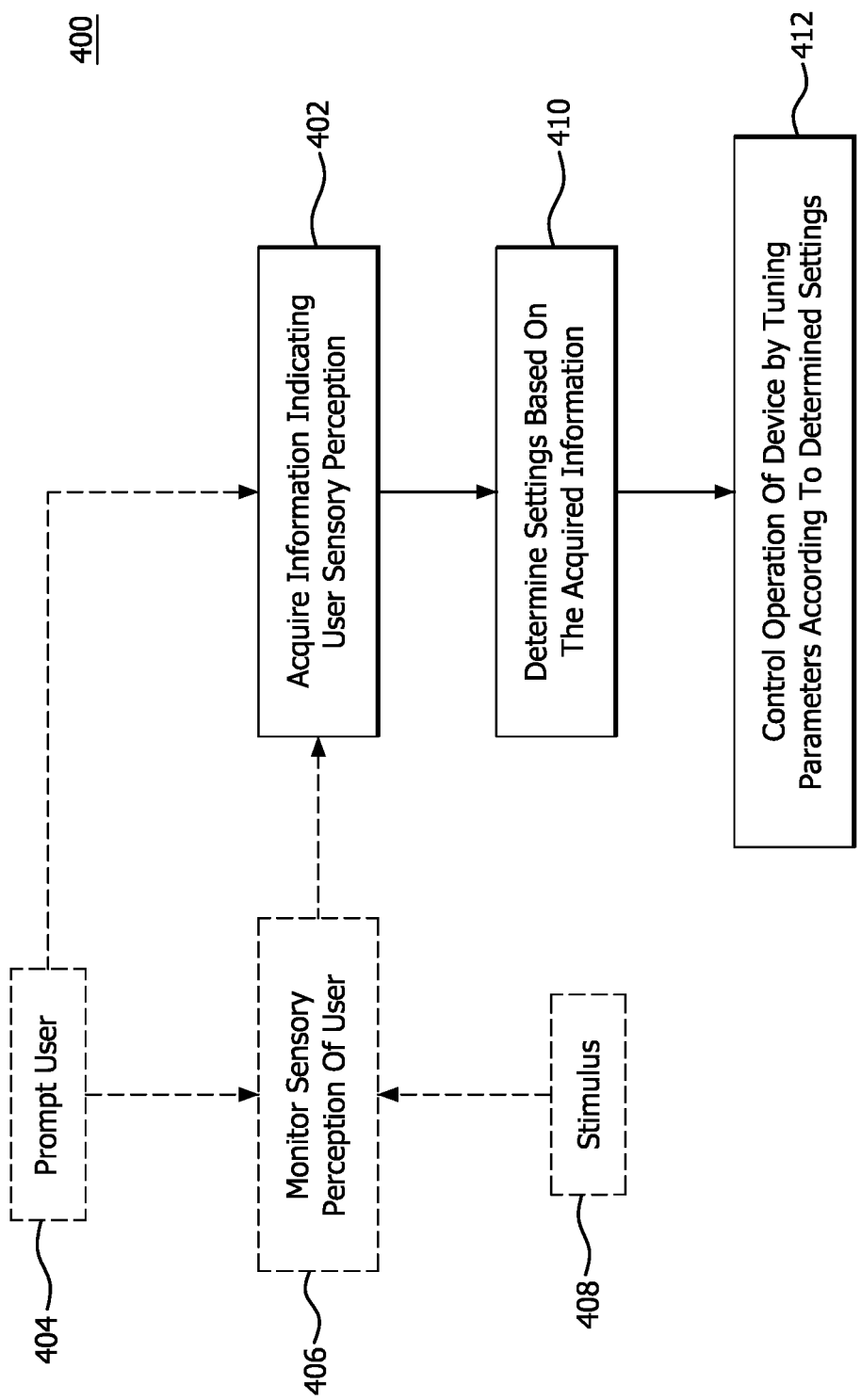
FIG. 4 is a flow diagram illustrating an example method of managing efficiency and performance of a device according to features of the present disclosure.

FIG. 4 is a flow diagram 400 illustrating an example method of receiving hardware parameter settings for managing efficiency and performance of a device. Alternatives of the method 400 are shown in phantom.

As shown in block 402 of FIG. 4, the method 400 includes acquiring information indicating a sensory perception of a user (e.g., visual perception, aural perception and tactile perception). For example, the acquired information can be an indication of a user's visual sensitivity to displayed images or video (e.g., visual sensitivity to flicker, color discernment, such as a minimum gradation of one or more colors that are visually perceptible and noise tolerance). Additionally, or alternatively, the acquired information can be an indication of a user's aural sensitivity to sound (e.g., dynamic range), Likewise, visual sensitivity also varies between individuals.

The information indicating a sensory perception of a user is, for example, acquired in response to prompting a user to perform one or more tasks (e.g., view video that is displayed using different device setting, such as different frame rates) and monitoring the sensory perception of the user while performing the one or more tasks (e.g., viewing the displayed video). Information indicating a sensory perception of the user is then acquired based on the monitoring. Alternatively, the information indicating the sensory perception of the user is information that is acquired from the user in response to a controlled stimulus to the user. The user can be made aware of the stimulus. The stimulus can also be provided without the user being aware of the stimulus or the user's participation in determining a sensitivity profile. In response to the controlled stimulus, the sensory perception of the user is monitored and the sensory data to be presented to the user is determined (e.g., via algorithm based insights) from the information acquired from the user in response to the controlled stimulus. For example, the video is displayed to the user at different frame rates without the user being made aware of the video being displayed at different frame rates. The user is monitored for physical reactions to determine a sensory perception of the user (e.g., whether or not the user observes flicker at different frame rates).

Additionally, or alternatively, information indicating a sensory perception is acquired by prompting the user to provide the information indicating their sensory perception. For example, while performing the one or more tasks (e.g., viewing the displayed video at different frame rates), the user is asked to answer one or more questions indicating a sensory perception (e.g., whether or not the user observes flicker at different frame rates). The sensory perception information is also acquired, for example, without prompting the user to perform the one or more tasks. For example, the sensory perception information is acquired by prompting the user to answer one or more questions (e.g., whether the user is color blind) which indicate a sensory perception of the user.

The information indicating a sensory perception of the user can be acquired via active user feedback as well as passive user feedback. For example, the information indicating a sensory perception can be actively acquired in response to prompting a user, as shown at block 404. The user can be prompted to perform one or more tasks (e.g., view video that is displayed using different device setting, such as different frame rates) and monitored (e.g., monitoring physical movements of a user, such as head movement, eye movement, body movement and blinking, as well as monitoring biological conditions, such as pulse and brain waves) the user for indications of the user's sensory perception while the user is performing the one or more tasks (e.g., viewing the displayed video).

The information indicating a sensory perception of the user is then acquired based on the monitoring. For example, a user is monitored (e.g., via a camera) and information indicating a sensory perception is acquired by determining a sensory perception (e.g., a sensitivity to video) based on viewed user feedback (e.g., the monitored physical movements and/or biological conditions).

Additionally, or alternatively, information indicating a sensory perception of the user is acquired by prompting the user, at block 404, to directly provide the information indicating their sensory perception. For example, while performing the one or more tasks (e.g., viewing the displayed video at different frame rates) prompted at block 404, the user is asked to answer one or more questions indicating a sensory perception (e.g., whether or not the user observes flicker at different frame rates or whether the user is color blind).

Alternatively, the information indicating the sensory perception of the user is information that is acquired from the user in response to a controlled stimulus to the user. The user can be made aware of the stimulus. The stimulus can also be provided without the user being aware of the stimulus or the user's participation in determining a sensitivity profile.

Information indicating sensory perceptions of multiple users of the device can also be acquired. For example, information is acquired which indicates one or more first sensory perceptions of a first identified user (e.g., via a user identifier) of a device and information is acquired which indicates one or more second sensory perceptions (e.g., different from the one or more first sensory perceptions of the first user. That is, information is acquired from one or more users and information can be acquired which indicates one or more sensory perceptions of the one or more users.

As shown at block 410 of FIG. 4, the method 400 includes determining settings for one or more parameters used to control operation of the device based on the acquired information indicating the sensory perception of the user. The user is characterized and profiled based on the acquired information. That is, based on the acquired information (actively acquired, passively acquired, directly acquired or indirectly acquired) one or more characterizations, traits, sensitivities or preferences of the user are determined based on the acquired information indicating the user's sensory perception.

For example, based on acquired information indicating a user's lack of sensitivity to sound, a determination is made regarding the user's inability to hear or perceive sound greater than a particular frequency (e.g., a frequency limit of 10,000 Hz), and settings for parameters used to control the sound provided at the device (e.g., settings for compressing audio data, speaker settings, amplifier settings) are determined which produce the sound at a lower audio quality (e.g., lower frequency than a frequency specified by a standard, such as MPEG) that is suitable to the user's aural perception.

Additionally, or alternatively, based on acquired information indicating a user's lack of sensitivity to displayed images or video (e.g., lack of sensitivity to flicker), settings for parameters used to control the display of images or video (e.g., frame rate settings, settings for compressing audio data, rendering settings, filter settings and other settings used to control the display of images or video) are determined which produce the video at a lower video quality suitable to the user's visual perception.

The settings for one or more users and user identifiers are, for example, stored in memory. A current user of the device is identified in response to user input providing the user identifier. Alternatively, a current user of the device can be identified in response to monitoring the user while operating the device.

As shown in block 412 of FIG. 4, the method 400 includes controlling the operation of the device by tuning the one or more parameters according to the determined settings. For example, frame rate parameters of video settings are tuned to reduce, maintain or increase the frame rate based on the acquired information indicates the user's sensitivity to flicker. Accordingly, when the acquired information indicates a lower sensitivity to flicker for a user, less power is consumed to provide the video at a sufficient level of quality perceptible by the user. Alternatively, if the acquired information indicates that the user is more sensitive to flicker, frame rate parameters of video settings are tuned to produce the video at a higher video quality, which causes more power to be consumed, but causes the device to operate at a level of performance (e.g., video quality) suitable for the user based on the user's sensitivity to flicker.

In addition, when settings are determined for multiple users, power and performance of the device is managed for each user, identified as a user currently operating the device, by tuning the one or more parameters according to the settings determined for each identified user based on the information acquired indicating the sensory perception of each identified user currently operating the device.

The configuration file is updated at block 404 of method 400. Updating the configuration instructions include, for example, overwriting each portion of the configuration file (i.e., overwriting the file itself), overwriting one or more portions of the configuration file (e.g., updating hardware parameter settings for previously received settings for one or more applications) and adding hardware parameter settings for one or more newly tested applications. Currently stored parameter settings (e.g., previously received settings for one or more applications) are identified, for example, via application names or API identifiers. The instructions are stored by overwriting the configuration instructions without overwriting or changing the device driver. That is, the settings are not hardcoded in the device driver and can be altered without modifying the device driver.

The updated configuration instructions are stored (e.g., as firmware) in non-volatile memory (e.g., hard-disk, motherboard boot ROM, and the like). Identifiers (e.g., application names and API identifiers) are also stored to identify hardware parameter settings with corresponding application names and API identifiers provided for the applications. When an application is executed, the instructions, including the identified hardware parameter settings for the corresponding application, are executed via memory at the device.

In addition, as described above, factors used to manage the efficiency and performance of a computing device can also include costs external to the computing device and, based on information indicating a user's sensory perception, parameters can be set to reduce costs external to the computing device.

Figure 5:
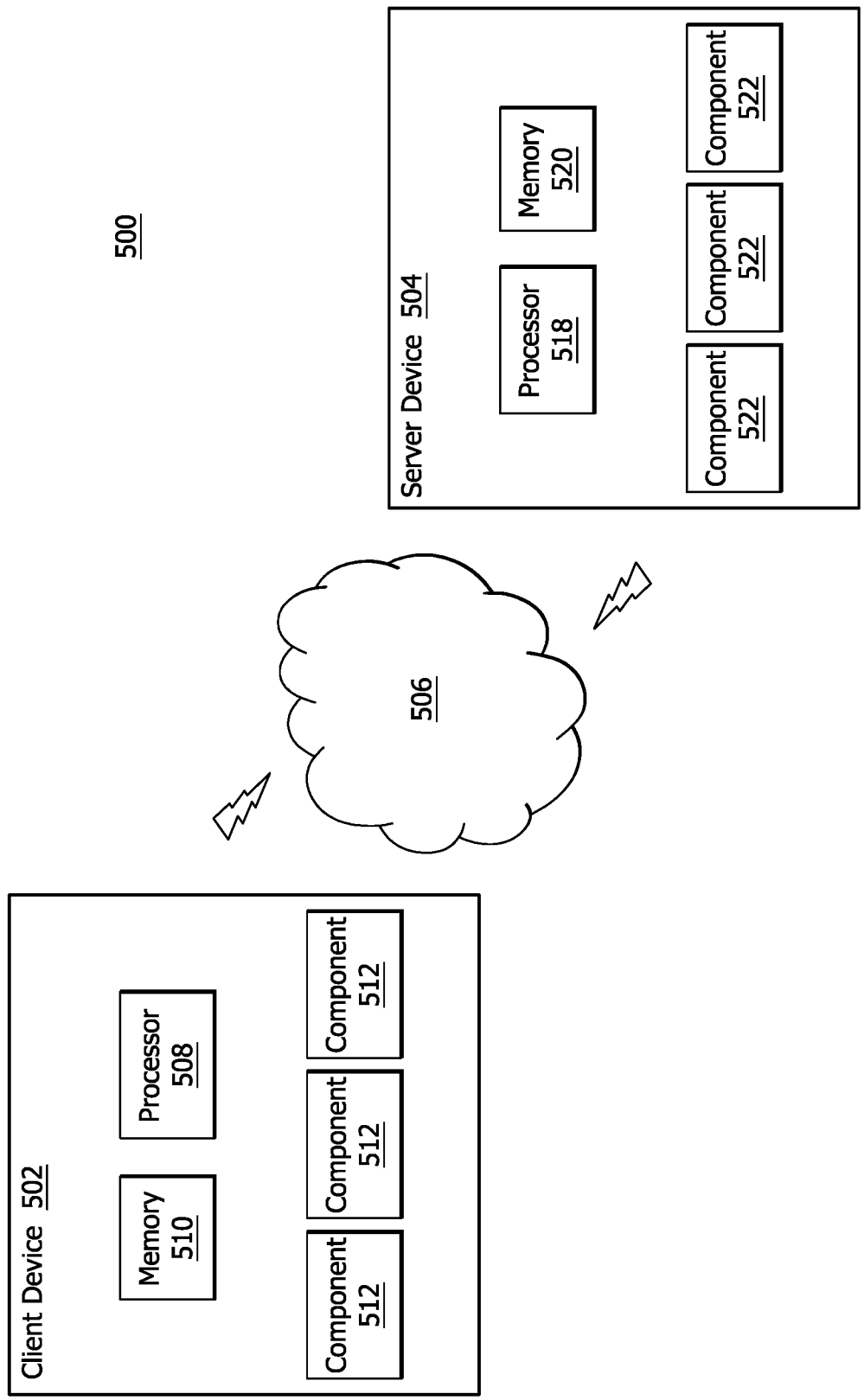
FIG. 5 is an example of interconnect network in which features of the present disclosure can be implemented.

FIG. 5 is an example of interconnect network 500 in which features of the present disclosure can be implemented. As shown in FIG. 5, the interconnect network 500 includes a client device 502 and a server device 504 and a network 506.

The client device 502 includes a processor 508, memory 510 and components 512. Processor 508 is, for example, a CPU or another processor, The components 512 include, for example, a processor (e.g., APD 116) and peripheral devices (e.g., input peripheral devices, output peripheral devices and storage devices). The client device 502 is, for example, an end user device which is configured to receive information (e.g., streaming video) from the server device 504 via the network 506.

The server device 504 also includes a processor 518, memory 520 and components 522. Processor 518 is, for example, a CPU or another processor, The components 522 include, for example, a processor (e.g., APD 116) and peripheral devices (e.g., input peripheral devices, output peripheral devices and storage devices). The server device is, for example, a device used to provide information (e.g., streaming video) to the client device 502.

The network 506 includes, for example, a wireless network (e.g., via WiFi, Bluetooth, cellular and other wireless standards), a wired (e.g., Ethernet, fiber optics, cable, and the like) or combination of wired and wireless networks, and decodes the video to be displayed.

The server device 504 is, for example, configured to test the bandwidth of end user devices, such as client device 502 to maintain a quality of service of providing streaming video to the end user devices. If it is determined that the bandwidth capability of the client device 502 is a lower bandwidth, costs at the server device 504 can be efficiently managed (e.g., reduced) by providing a lower resolution video to the client device 502 as compared to higher cost of providing a higher resolution video to the client device 502. For example, the lower resolution video data can be sampled at a lower sampling rate (e.g., 60 kHz) at the server device 504 than the sampling rate (e.g., 120 kHz) for higher resolution video data. Accordingly, additional resources (processors, processor cores, memory, and bandwidth) can be freed up for other functions.

The client device 502 is configured to receive information (e.g., streaming video) from the server device 504. Based on the acquired user sensory perception, the processor 508 determines the settings for one or more parameters used to control operation of the client device 502 using one or more factors contributing to a performance of the client device 502 as well as one or more factors contributing to a performance of the server device 504.

For example, the one or more factors contributing to a performance of the client device 502 include factors for processing video data, factors for processing audio data, power consumption, bandwidth usage, latency, visual quality, aural quality, a type of processor. The factors contributing to the performance of the client device 502 also include moving workloads between different processors and processor cores of a device. For example, based on user sensory perception information, portions of data (e.g., a workload) is determined to be processed by one processor (e.g., CPU) while an audio co-processor (ACP) is used to process audio data That is, it is determined that the ACP is better served for the user to process a portion of audio data based on the user sensory perception information.

Factors contributing to the performance of the server device 504 include, for example, a cost for the server device 504 to process and provide lower resolution video data (e.g., lower sampling rate, freeing up additional resources at the server device and power consumption at the server device 504.

Factors for controlling and managing the efficiency and performance of the device also include determining (e.g., weighing) the opportunity costs of setting one or more parameters versus one or more other parameters. For example, the determination includes the cost of using resources (e.g., processor, memory, bandwidth or other resources) to perform functions and free up other resources to perform other functions.

It should be understood that many variations are possible based on the disclosure herein. Although features and elements are described above in particular combinations, each feature or element can be used alone without the other features and elements or in various combinations with or without other features and elements.

The methods provided include implementation in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements application profiling for power-performance management.

The methods or flow charts provided herein can be implemented in a computer program, software, or firmware incorporated in a non-transitory computer-readable storage medium for execution by a general purpose computer or a processor. Examples of non-transitory computer-readable storage mediums include a ROM, a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A device comprising:
   memory;
   a processor, in communication with the memory, configured to:
      acquire information indicating a sensory perception of a user without a user input, the information based on at least one of monitored physical movements or monitored biological conditions of the user;
      determine settings for one or more parameters used to control operation of the device based on the information indicating the sensory perception of the user; and
      control the operation of the device by tuning the one or more parameters according to the determined settings.

2. The device of claim 1, wherein the memory is configured to store, in the memory, settings for the parameters used to control operation of the device.

3. The device of claim 1, wherein the memory is configured to store different settings for a plurality of users of the device, and
   the processor is configured to:
      acquire information indicating sensory perceptions of the users;
      determine, for each of the users, settings for one or more parameters used to control operation of the device based on the information indicating the sensory perception of the users;
      identify one of the users as a user operating the device, and
      control the operation of the device by tuning the one or more parameters according to the determined settings for the identified user.

4. The device of claim 1, wherein the information indicates a visual sensitivity of the user.

5. The device of claim 1, wherein the information indicates an aural sensitivity of the user.

6. The device of claim 1, wherein the processor is configured to control the operation of the device by at least one of switching between different processors of the device, tuning device driver settings, tuning firmware settings and tuning operating system settings.

7. The device of claim 1, wherein the processor is configured to:
   prompt the user to perform one or more tasks; and
   monitor the at least one of the monitored physical movements or the monitored biological conditions of the user while the user is performing the one or more tasks.

8. The device of claim 1, wherein the processor is configured to:
   provide a stimulus to the user; and monitor the at least one of monitored physical movements and monitored biological conditions of the user in response to the stimulus;
determine the information indicating the sensory perception and acquired without the user input, from the monitoring; and
determine the sensory perception of the user in response to the stimulus.

9. The device of claim 1, wherein the processor is configured to manage an efficiency and performance using one or more factors comprising factors for processing video data, factors for processing audio data, power consumption, bandwidth usage, latency, visual quality, aural quality, a type of processor.

10. The device of claim 1, wherein the device is a client device configured to receive information from a server device and the processor is configured to determine the settings for one or more parameters used to control operation of the device using one or more factors contributing to a performance of the client device and one or more factors contributing to a performance of the server device.

11. The device of claim 1, further comprising a display configured to display video to the user,
wherein the processor is configured to display the video to the user, via the display, at different video display settings; and
the information indicating the sensory perception of the user is information indicating a sensitivity of the user to the video displayed at the different video display settings.

12. A method for managing efficiency and performance of a device, the method comprising:
monitoring at least one of monitored physical movements and monitored biological conditions of a user;
acquiring information indicating a sensory perception of the user without a user input, the information based on at least one of the monitored physical movements or the monitored biological conditions of the user;
determining settings for one or more parameters used to control operation of the device based on the information indicating the sensory perception of the user; and
controlling the operation of the device by tuning the one or more parameters according to the determined settings.

13. The method of claim 12, further comprising:
storing different settings for a plurality of users of the device;
acquiring information indicating sensory perceptions of the users;
determining, for each of the users, settings for one or more parameters used to control operation of the device based on the information indicating the sensory perception of the users;
identifying one of the users as a user operating the device, and
controlling the operation of the device by tuning the one or more parameters according to the determined settings for the identified user.

14. The method of claim 12, wherein the information indicates at least one of a visual sensitivity of the user and an aural sensitivity of the user.

15. The method of claim 12, further comprising controlling the operation of the device by at least one of switching between different processors of the device, tuning device driver settings, tuning firmware settings and tuning operating system settings.

16. The method of claim 12, further comprising:
prompting the user to perform one or more tasks; and
monitoring the at least one of the monitored physical movements or the monitored biological conditions of the user while the user is performing the one or more tasks.

17. The method of claim 12, further comprising:
providing a stimulus to the user; and
monitoring the at least one of monitored physical movements and monitored biological conditions of the user in response to the stimulus;
determining the information, indicating the sensory perception and acquired without the user input, from the monitoring; and
determining the sensory perception of the user in response to the stimulus.

18. The method of claim 12, further comprising:
receiving information from another device via a network,
determining the settings for one or more parameters used to control operation of the device using one or more factors contributing to a performance of the device and one or more factors contributing to a performance of the other device.

19. The method of claim 12, further comprising providing a sound to the user at different sound settings,
wherein the information indicating the sensory perception of the user is information indicating a sensitivity of the user to the sound provided at the different sound settings.

20. A non-transitory computer readable medium comprising instructions for causing a computer to execute a method for managing efficiency and performance of a device, the instructions comprising:
monitoring at least one of monitored physical movements or monitored biological conditions of a user in response to a stimulus;
acquiring information indicating a sensory perception of a user without a user input, the information based on the at least one of the monitored physical movements or the monitored biological conditions of the user;
determining settings for one or more parameters used to control operation of the device based on the information indicating the sensory perception of the user; and
controlling the operation of the device by tuning the one or more parameters according to the determined settings.

* * * * *